Figure 1:
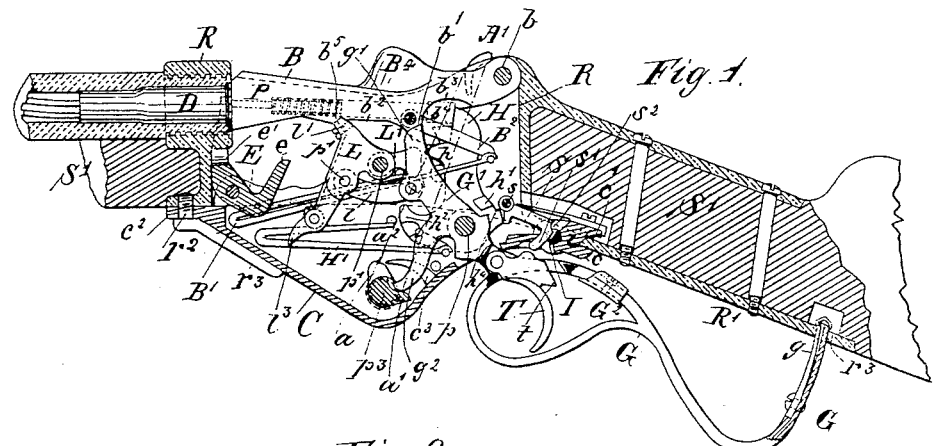

(No Model.) 6 Sheets—Sheet 1.

C. SALVATOR & G. R. VON DORMUS.
MAGAZINE FIRE ARM.

No. 326,676. Patented Sept. 22, 1885.

Witnesses
Inventors

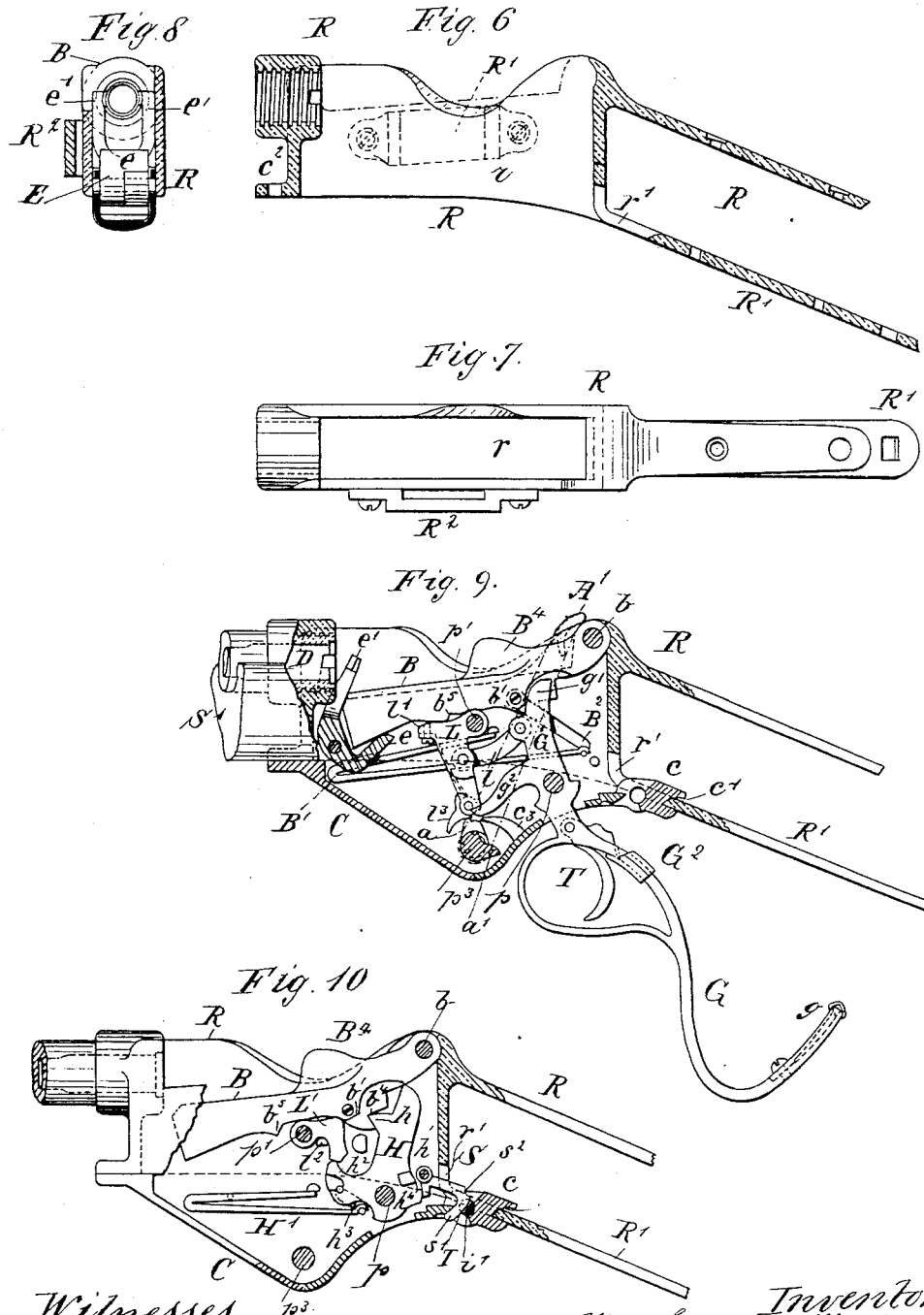

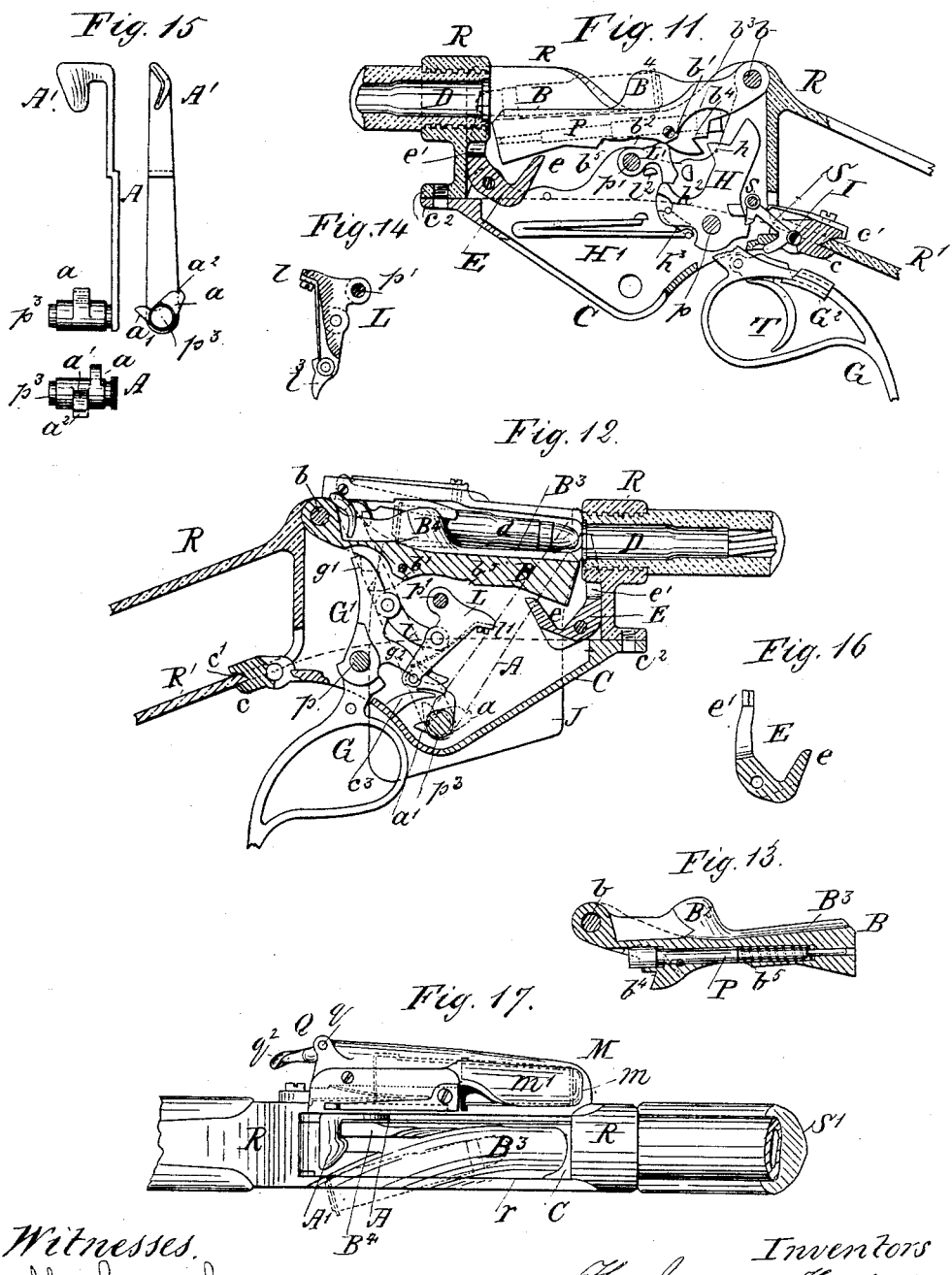

(No Model.) 6 Sheets—Sheet 4.
C. SALVATOR & G. R. VON DORMUS.
MAGAZINE FIRE ARM.
No. 326,676. Patented Sept. 22, 1885.
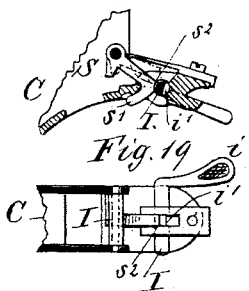
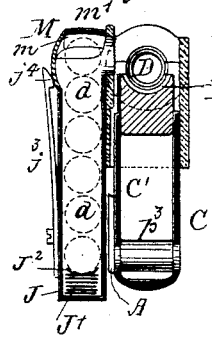
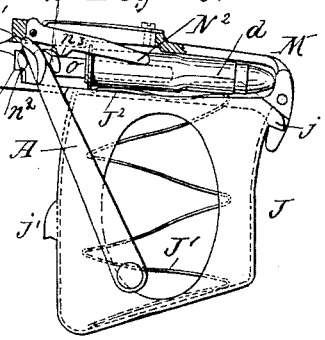
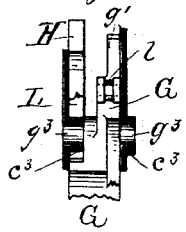
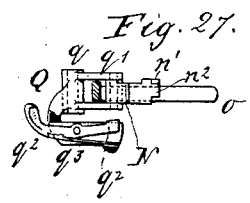
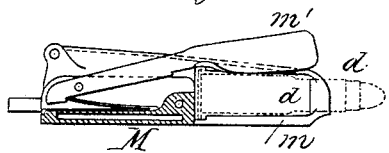
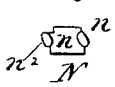
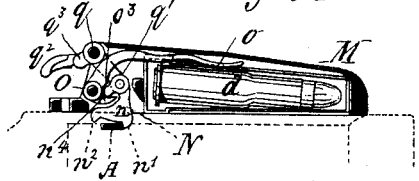
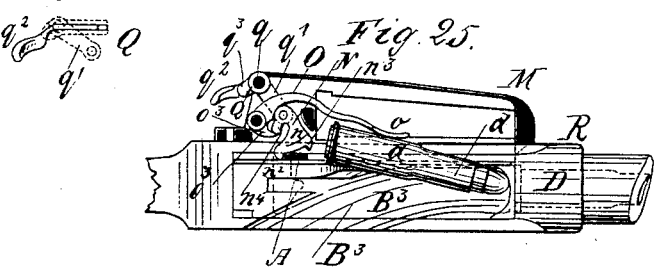
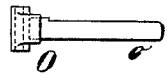
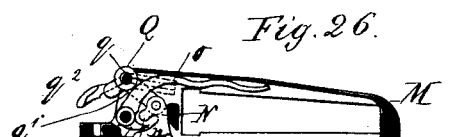
Witnesses.
Inventors
His Imperial Highness
Archduke Carl Salvator
Georg Ritter von Dormus
Henry Orth (No Model.) 6 Sheets—Sheet 5.
C. SALVATOR & G. R. VON DORMUS.
MAGAZINE FIRE ARM.
No. 326,676. Patented Sept. 22, 1885.
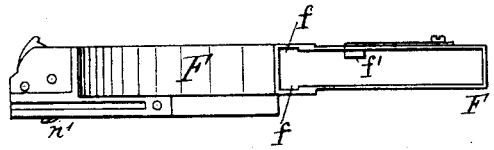
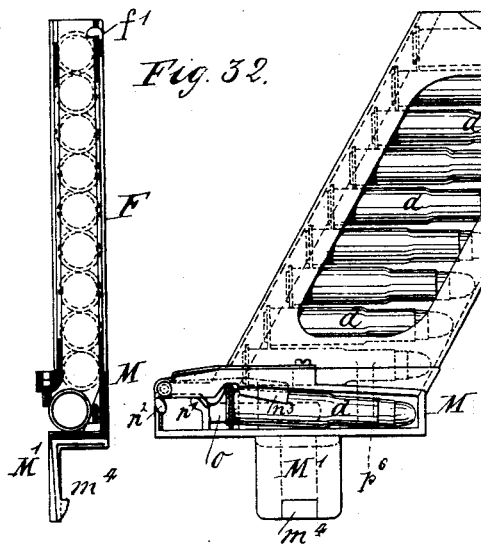
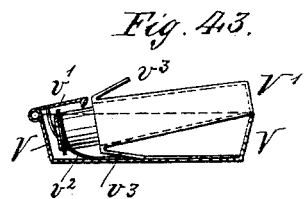
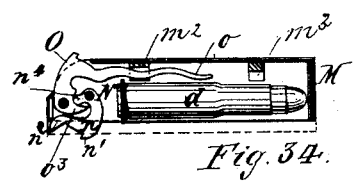
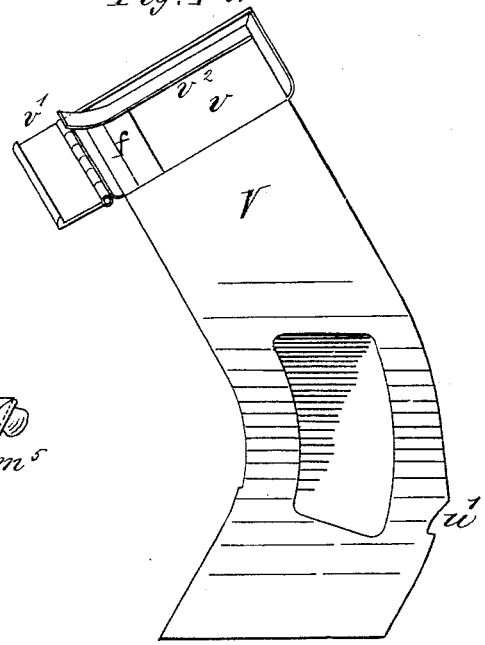
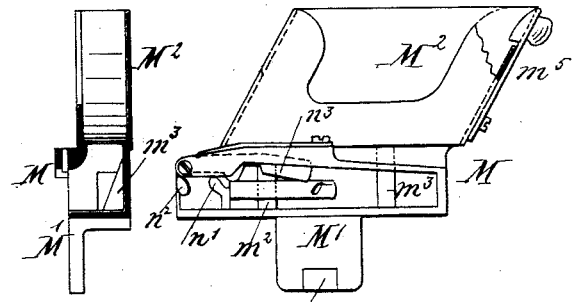

(No Model.) 6 Sheets—Sheet 6.
C. SALVATOR & G. R. VON DORMUS.
MAGAZINE FIRE ARM.
No. 326,676. Patented Sept. 22, 1885.
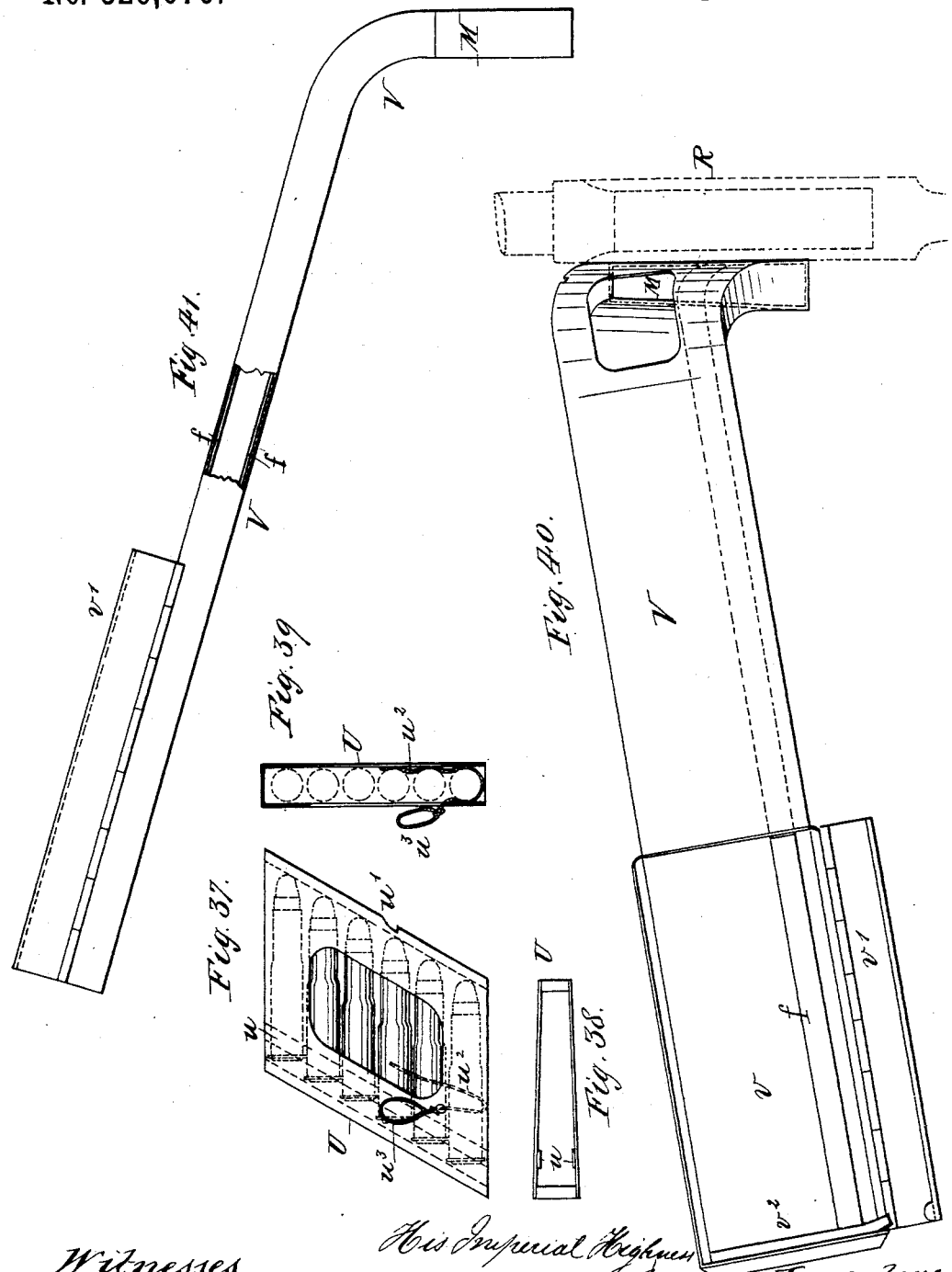

UNITED STATES PATENT OFFICE.

ARCHDUKE CARL SALVATOR AND GEORG RITTER VON DORMUS, OF VIENNA, AUSTRIA-HUNGARY; SAID VON DORMUS ASSIGNOR TO SAID SALVATOR.

MAGAZINE FIRE-ARM.

SPECIFICATION forming part of Letters Patent No. 326,676, dated September 22, 1885.

Application filed November 24, 1884. (No model.) Patented in Germany July 18, 1884, 1,953; in France July 19, 1884, No. 163,390; in Belgium July 19, 1884, No. 65,826; in England July 19, 1884, No. 10,365; in Italy September 30, 1884, XVIII, 17,152, XXXIV, 101; in Austria-Hungary October 1, 1884, No. 34,196 and No. 45,030, and in Spain November 15, 1884, No. 6,367.

*To all whom it may concern:*

Be it known that we, ARCHDUKE CARL SALVATOR and GEORG RITTER VON DORMUS, subjects of the Emperor of Austria, residing at Vienna, in Austria-Hungary, have invented certain new and useful Improvements in Magazine Fire-Arms, (for which Letters Patent have been granted in Austria-Hungary, No. 34,196 and No. 45,030, dated October 1, 1884; in France, No. 163,390, dated July 19, 1884; in Belgium, No. 65,826, dated July 19, 1884; in Italy, 17,152, 101, dated September 30, 1884; in Spain, No. 6,367, dated November 15, 1884; in England, No. 10,365, dated July 19, 1884,) of which the following is a full, clear, and exact description.

The object of this invention is to produce a fire-arm capable of being rapidly fired without removing the gun from the position of firing; and it consists in mechanism for automatically conveying the cartridges from a magazine applied to one side of the gun into the breech thereof; in a vertically-swinging breech-block arranged to actuate a cartridge-shell extractor; in a novel arrangement, construction, and combination of mechanism for arming, loading, and firing the gun through the medium of the trigger-guard lever, and in combination therewith of a trigger whereby the gun may be fired by the latter or through the trigger-guard; in the arrangement of the mechanism above referred to within a casing detachably secured in rear of the breech of the gun; in the application to the side of the gun of a magazine detachably connected with said gun and adapted for use with removable paper cartridge-cases; in means for increasing the supply of ammunition to the gun, and, lastly, in certain details of construction, combination, and arrangement of the parts that constitute the improvements, all as hereinafter more fully described, and as shown in the accompanying drawings, in which—

Figure 2:
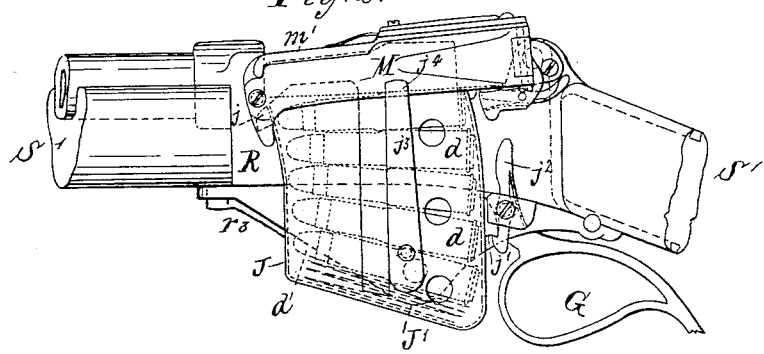

Figure 1 is a vertical longitudinal section of so much of a gun as is necessary to illustrate the invention, the parts being shown in the position for firing. Fig. 2 is a side elevation thereof. Figs. 3 to 8, inclusive, 13, and 15 to 30, inclusive, are detail views. Figs. 9, 10, 11, and 12 are vertical longitudinal sections of the breech mechanism, showing the parts in the different positions they assume during the manipulation of the arm. Figs. 31 to 43 inclusive, are detail views of the various forms of magazines adapted for use with the improved gun and of paper cartridge-cases for the same.

Figure 3:
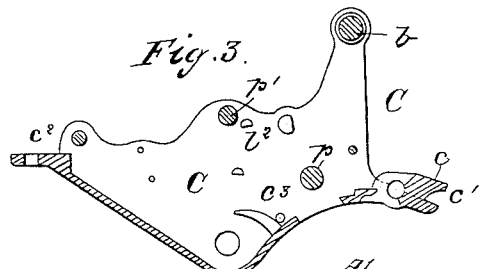
Figure 4:
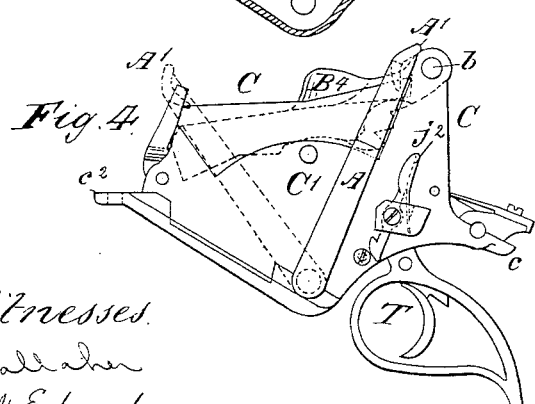
Figure 5:
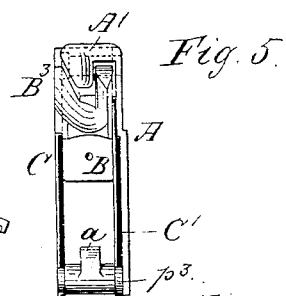

The entire breech and lock mechanism is contained within a casing, C, Fig. 3, open at top and adapted to receive a covering-plate, C′, Figs. 4 and 5, on its left side, and when said plate is applied the casing is adapted for introduction from below into a suitable cavity or chamber, $r$, formed in the receiver R, Figs. 6, 7, and 8, that is secured to the gun-stock S′. The casing C is provided with a lug or rib, $c$, projecting from its lower rear face, said rib having a beveled notch or recess, $c'$, which engages the edge of the tang R′ of the receiver, which is slotted at that point, as shown at $r'$, Fig. 6, whereby the rear end of the breech-mechanism case C is secured in position. The forward end of said case is secured to the receiver R by means of a screw, $r^2$, provided with a thumb-piece, $r^3$, as shown in Fig. 1, the casing being for this purpose provided with an extension or projection, $c^2$. In this manner the entire breech and lock mechanism may be bodily and readily removed from the gun and replaced, and by bringing the breech-block into position to close the breech the several parts of the mechanism assume the positions shown in Fig. 1.

The breech and lock mechanisms are composed of the following essential parts:

G is the trigger-guard lever, the free end of which is provided with a locking-spring, $g$, that engages with the forward edge of a slot, $r^2$, formed in the lower tang, R′, of the receiver R, and serves to hold said lever securely in position when fully moved back, yet allowing the same to be readily swung forward on its pivot $p$, secured to the lock-case C.

B is the breech-block, pivoted at $b$ to the casing C. It is provided on its under side with a projecting shoulder, $b'$, formed by and between two recesses, $b^2$ $b^3$. At its forward end the trigger-guard lever G has an extension, G', the upper arm, $g'$, of which abuts against the shoulder $b'$ on the under side of the breech-block B, and supports the same securely in position to close the breech, as shown in Fig. 1.

H is the hammer, that has an offset or nose, $h$, which engages a notch, $b^4$, on the under side of the breech-block, and serves also to support the latter.

L is a transmitting-lever, pivoted upon a pin, $p'$, and connected with the extension G' of the trigger-guard lever G by means of a link, $l$. The lever has a projection or nose, $l'$, that rests in a notch, $b^5$, formed in the under side of the breech-block B, Fig. 1, and also serves to hold the same in position to close the breech.

B' is the breech-block spring, Figs. 1 and 9, connected with the breech-block B by means of a link, $B^2$, the spring being at its greatest tension when the breech-block is in position to close the breech, as in Fig. 1.

A, Figs. 1, 9, 12, 15, 22, 24, and 26, is the cartridge-conveyer; E, the cartridge-shell extractor, and T the trigger.

It will be observed that the breech-block, when in position to close the breech, is supported from three points, $b'$ $b^4$ $b^5$, by the arm $g'$ of the trigger-guard extension G', the nose $l'$ of the transmitting-lever L, and the nose $h$ of the hammer H, so that there is no danger of a displacement of the block from the recoil or any other cause.

By the forward movement of the guard-lever the following simultaneous and automatic movements and functions take place in the breech and lock mechanism, and in order that these movements and functions may be better understood we have shown said mechanism separately, Figs. 9 and 12 showing the breech mechanism as seen from opposite sides, and Figs. 10 and 11 showing the lock mechanism. The two latter figures show said lock mechanism in the position it assumes when the breech mechanism assumes a given position. Thus Fig. 10 shows the position the lock mechanism assumes when the breech mechanism is in the position shown in Fig. 9, and Fig. 11 shows the position said lock mechanism assumes when the breech mechanism is in position shown in Fig. 12. If the trigger-guard lever G is moved forward, its arm $g'$ of its extension G' will slide from under the shoulder $b'$ of the breech-block B, and through the connecting-link $l$ the transmitting-lever L is tilted forward on its pivot $p'$, the nose $l'$ of the lever sliding out of the notch $b^5$ of the breech-block B. Simultaneously with these operations the rear face of the extension G' of the trigger-guard G engages a lug, $h'$, on the hammer H, (which also performs the function of a tumbler,) which hammer is tilted back, its nose $h$ moving out of the recess $b^4$ of the breech-block B, which is now free to turn on its pivot $b$. The breech-block spring B', through the link $B^2$, now draws the breech-block downward with great force, and the forward inclined under face of said block comes in contact with the arm $e$ of the angular lever or shell-extractor E, tilting the same, thereby throwing its extractor-arm $e'$ backward with great force, and as said arm lies in front of the flange of the cartridge-shell said shell is extracted from the breech and thrown out. In the upper face of the breech-block B is formed a groove, $B^3$, that serves to guide the cartridges into the breech. This groove, as shown in Figs. 17 and 25, is curved outwardly toward the right, the receiver R being cut away at that point, as shown at Figs. 6 and 17. On the left side of the groove, at the point where it diverges toward the right, the breech-block B is provided with a projection or horn, $B^4$, that serves to deflect the empty shells toward the right when ejected by the extractor E. By means of this construction the person handling the gun when rapidly firing without unshouldering the same is shielded or protected from injury or annoyance by the ejected empty shells.

It will be observed that the extraction and ejection of the empty shells require no effort on the part of the marksman, but is effected by the power exerted by the spring B' upon the breech-block and transmitted through the latter to the extractor E.

Fig. 9 shows the breech mechanism in the position it assumes immediately after the cartridge-shell has been ejected from the breech, and Fig. 10 shows the position the lock mechanism assumes at that moment. As shown in the latter figure, the hammer H has a projection or nose, $h^2$, that then abuts against one of the beveled edges of the free end of a bent or angular lever, L', pivoted on the pivot $p'$ of the transmitting-lever L, the downward movement of which angular lever is limited by a lug or stud, $l^2$, projecting from the case C. If the trigger-guard lever G is now moved forward to the limit of its movement in that direction, the hammer H is moved rearwardly, and a sear, S, pivoted at $s$, engages a notch, $h^4$, on the rear face of the hammer H, and locks it into position. By this rearward movement of the hammer its spring H', connected therewith by a link, $h^3$, is brought to its greatest tension and the hammer is cocked, said hammer, as above stated, acting as a tumbler. As the hammer is moved to a full-cock as described its nose $h^2$ lifts the breech-block B through the lever L' sufficiently to bring the end of the guide-groove $B^3$ flush with the bore of the breech, so that the cartridge to be inserted may be pushed into the breech-chamber D, as shown in Fig. 11. Simultaneously with the described movements of the hammer and breech-block the transmitting-lever L is drawn farther back through the link $l$, that connects it with the trigger-guard lever G, and a spring-pawl, $l^3$, pivoted to the lower end of lever L, is caused to ride over a stud or lug, $a$, that projects radially from the pivot $p^3$ of the cartridge-conveyer A, said pawl taking into a notch, $a^2$, of said lug $a$. (See Fig. 12.) When the pawl is in the described position, it is supported from and guided by a curved arm or horn, $c^3$, formed on and projecting from the casing C.

If the gun is to be used as a single-loader, a cartridge, $d$, may now be placed in the guide-groove $B^3$, (see Fig. 11,) and by moving the trigger-guard lever G backward the transmitting-lever L is moved forwardly. As shown in Fig. 15, the cartridge-conveyer A terminates in a head or follower, A', that projects down into the groove $B^3$ in rear of the cartridge $d$, as shown in Fig. 4 and in dotted lines in Figs. 1 and 9, and when the transmitting-lever L is moved back on the backward movement of the trigger-guard G, as just described, the pawl $l^3$ rotates the pivot $p^3$ of the conveyer A, the follower-head A' of which rams the cartridge home into the breech-chamber D, said conveyer-lever then lying in the position indicated in dotted lines, Fig. 12. As soon as the pawl $l^3$ becomes disengaged from the notch $a^2$ of lug $a$ on the conveyer-pivot, an arm, $g^2$, projecting from the extension G' of the trigger-guard lever G, bears upon a lug or stud $a'$ on the conveyer-pivot $p^3$, and returns the same into its normal position, as shown in Fig. 1. Simultaneously with or a little after the conveyer A has been moved into its normal position the transmitting-lever L lifts the breech-block B to close the breech-chamber D, thereby again bringing the breech-block spring B' to its greatest tension, and the upper arm, $g'$, of the extension of the trigger-guard lever moves back into position to support the breech-block. By pressing upon the trigger T it impinges upon a downwardly-projecting arm, $s'$, of the sear S and moves the same out of engagement with the hammer-notch $h^4$, the hammer H being then thrown forward by its spring H' upon the firing-pin P, arranged centrally within the breech-block B, as shown in Fig. 13, to explode the charge.

To adapt the gun to be fired without manipulating the trigger, we provide a slide-catch, $G^2$, that is mounted upon the trigger-guard lever G, the forward end of which slide-catch is adapted to engage a tail-piece or projection, $t$, of the trigger T, to lock the same into the proper position so as to release the sear S from the hammer-notch when the trigger-guard lever G is carried back to the limit of its backward motion, as shown in Fig. 1.

From the above description it will be seen that the two movements are or may be required to load and fire the gun, and that such loading and firing are or may be effected by the manipulation of the trigger-guard only. By the forward movement of the trigger-guard the breech-chamber D is opened, the empty cartridge-shell extracted and ejected therefrom, and the hammer is brought to full-cock by the rearward movement of said trigger-guard, the breech-block is partially raised, the cartridge rammed home, the breech-chamber closed, and the charge exploded. If, previous to firing, it is desired to remove a cartridge from the breech-chamber, the trigger-guard is rapidly thrown forward. The breech-block B will then be moved downwardly a sufficient distance only to uncover the breech, the movement of the breech-block being limited by the angular lever L', held by the nose $h^2$ of the hammer when the latter is at full-cock. Yet in this limited downward movement of the breech-block B its spring B' exerts sufficient power thereon to extract the cartridge.

To lock the firing mechanism out of action, the gun, as shown in Figs. 1, 10, 11, 18, and 19, is provided with a locking-pin, I, terminating in thumb-piece or crank $i$ on the right of the gun. The pin has a portion, $i'$, thereof cut away at a point immediately in rear of the sear S, and the latter has a recess, $s^2$, the face of which is an arc of a circle drawn from the axis of the pin 1.

It is obvious that when the sear holds the hammer at full-cock and the cut-away portion of the locking-pin is immediately in rear of said sear the latter is free to rotate on its pivot; but when the pin I is turned so that the cut-away portion $i$ will be removed from in rear of the sear, then the body of the pin will lie in the recess $s^2$ of the sear S, and lock the same against movement on its pivot $s$, as plainly shown in Fig. 18, thus providing a means to guard against accidental discharge of the gun.

In Fig. 20 I have shown a modification in the mode of pivoting the trigger-guard lever G, which, instead of being supported from a pivot, is provided with trunnions or journals $g^3$, that rest in bearings $c^3$, formed in the case C and covering-plate C'. One of these bearings projects inwardly, as shown, and serves as a pivot for hammer H.

Any suitable magazine—as, for instance, the magazine known as the "Manulicher" magazine—may be employed with our improved gun. We prefer, however, to employ a magazine especially designed for use with the gun, which we will now describe, referring to Figs. 2, 21, and 22. The magazine is composed of a case, J, adapted to be detachably secured to one side of the receiver R, having a cap, M, containing the repeating or cartridge-feeding mechanism, and is of such capacity as to hold five or more cartridges, $d$. Instead of detachably securing the magazine to the receiver, it may be so secured to a separate cap, M, for the same, as shown in Fig. 2. To this end the casing has a lug or lip, $j$, that projects from its forward upper portion, and a like lug or lip, $j'$, that projects from its rear end, with which engages a spring-catch, $j^2$, pivoted to the side of the receiver R, while the lip $j$ on its upper forward end lies against the inside of the cap M. It is obvious that by simply disengaging the lip $j'$ from the catch $j^2$ the magazine may be readily removed when empty and a full one substituted. Upon the outside of the magazine is secured a spring, $j^3$, that terminates in a hook, $j^4$, which holds the cartridges from falling out or being thrown out by the follower spring J', secured to the bottom of the magazine. When the magazine is applied to the cap M, the spring $j^4$ is forced outwardly by the side wall of said cap, thus releasing the hook thereof from engagement with the uppermost cartridge, and leaving the tier of superposed cartridges free to be moved upward by the follower-spring J', as shown in Fig. 21. The cap M may, if desired, receive a sixth cartridge $d$, that is introduced through an opening, $m$, Fig. 23, formed in the top of the cap M, and adapted to be closed by a gate, $m'$, pivoted to the top of said cap M. By means of this arrangement the magazine may be charged from the top through this opening $m$, if desired, without removing the same; or the gun may be used as a single-loader by introducing the cartridges, as described, one at a time, each cartridge being supported by the follower $J^2$, held to its limit of upward motion by the distended spring J'.

As hereinbefore stated, the cartridges are carried into the breech-chamber by the conveyer A. It is, however, necessary to provide means to move said cartridges from the cap M one by one and place them into position to be seized by the follower or head A' of the conveyer A before the latter can convey them into the breech-chamber D. To this end we provide a feed mechanism arranged within the cap M, whereby one cartridge at a time is fed to the groove $B^3$ in the following manner: N is an angular lever pivoted within the cap M, to rotate in a horizontal plane. One of its arms, $n$, has a segmental face with a stop, $n'$, at one end of the segment, and a stop, $n^2$, at the opposite end of said segment. When the conveyer A is moved to the limit of its motion rearwardly, as hereinbefore described, it is caught between the stops $n'$ and $n^2$ of the arm $n$ of lever N, and when said conveyer A is moved forward it tilts lever N on its pivot through the stop $n'$. By the partial rotation of the lever N the upper inclined face of the stop $n'$ impinges on a curved projection, $n^3$, formed on the under side of a spring-actuated gate, $N^2$, pivoted to cap M, and lifts the same, so that the cartridge within said cap may be moved out, said cap being open on the side facing the guide-groove $B^3$ of the breech-block B. In its normal position the gate is held down in front of the opening, to prevent the cartridge in the cap from falling out; hence, when said latch-gate is lifted, it uncovers that side of the cap, to permit a cartridge to pass into the guide-groove $B^3$. Simultaneously with the described movement of lever N the arm $n^4$ thereof presses against the arm $o^3$ of another angular lever, O, the arm $o$ of which, when in its normal position, lies close to the outer wall of cap M, behind the cartridge therein, said lever being also arranged within the cap M to rotate horizontally on its pivot, causing the other arm, $o$, of said lever O to move laterally and carry with it the upper cartridge, or that cartridge lying within the cap M, as shown in Fig. 25. On emerging from the cap M the projection or horn $B^4$ of the breech-block directs the cartridge toward the guide-groove $B^3$ and the opening of the breech-chamber D. When the described movements of the levers N O, under the power exerted by the conveyer A, have taken place, the cartridge will lie in proper position to be carried into the groove $B^3$ of the breech-block B. The conveyer at the same time, passing by the stop $o$, pushes the cartridge forward until it has passed by the horn $B^4$ and entered the groove $B^3$ of the breech-block, when the follower or head A' of the conveyer A pushes the cartridge rapidly home into the breech-chamber D.

The described mechanism for automatically carrying the cartridges one by one from the magazine into the breech-chamber will operate whatever may be the position in which the gun is held. By an examination of Fig. 25 it will be seen that while a cartridge is being conveyed from the magazine to the breech-chamber the lever O is finally locked into position by the lever N; hence the arm $o$ of lever O could not by accident be moved back into its normal position, since the arm $n^4$ of lever N, resting upon the outer end of the segmental arm $o^3$ of lever O, locks the latter against rotation on its pivot. It will also be seen that the stop $n'$, by the partial rotation of lever O, has been moved out of the path of the conveyer A; hence on its return movement said conveyer will strike the stop $n^2$ and tilt the lever N in a reverse direction. The arm $n^4$ of lever N now moves along the curved upper face of arm $o^3$ of lever O until said arm $n^4$ reaches the end of the curve, when it will tilt lever O on its pivot and move the arm $o$ thereof back into its normal position into the cap M. It will further be observed that while a cartridge is being carried into the breech-chamber—in fact, until the trigger-guard is moved back to fire the gun or bring the trigger in position for firing the gun as above described—the arm $o$ of lever O lies across the mouth of the magazine, and not only prevents the next cartridge from being pushed into the cap M, but also prevents the gate $N^2$ from closing the open side of said cap. As soon, however, as the arm $o$ of lever O has been moved back into its position within the cap M the gate $N^2$ is free to move down under the tension of its spring, and at the same time the mouth of the magazine is uncovered to allow the succeeding cartridge to be fed into the cap by the spring-actuated follower $J^2$ of the magazine.

When the gun is to be used as a single-loader, it may be found desirable to lock the cartridge-conveying mechanism out of operation. This we accomplish by the following devices: Q, Figs. 24, 25, 26, 27, and 30, is a two-armed lever arranged to rotate horizontally on a pivot, $q$, secured to the cap M at its rear end. The arm $q'$ of lever Q is forked, and serves as a bearing for the pivot of lever N. Upon the arm $q^3$ of lever Q is pivoted a spring-catch, $q^2$, the free end of which extends under the cap M, which is at that point provided with two notches, into one or the other of which the catch may be moved to throw the lever N into or out of operation. By turning the lever Q toward the left by means of catch $q^2$, Fig. 2, the lever N is also moved toward the left, and its arm $n$ and stops $n'$ $n^2$ are withdrawn from the path of the cartridge-conveyer A into cap M, Fig. 26, which conveyer can therefore not actuate the lever, as above set forth, and when the lever Q is moved toward the right then the lever N is again moved back, with its arm $n$ and stops $n'$ $n^2$ in the path of conveyer A. Of course it will be understood that the gun may be provided with a permanently-attached magazine, and instead of this, or instead of the magazine suspended from the cap M, a magazine of the construction shown in Figs. 31 to 34, inclusive, may be employed, which magazine is adapted to be inserted in place from above the gun. This magazine is composed of a frame, F, that has at one end, and facing each other, two shallow grooves, $f$, into which fit the flanges of the cartridge-shells, and by which they are guided, both in charging the magazine and while the cartridges are fed to the gun. The frame F is at one end connected with a cap M similar to that described in reference to the magazine J, in which cap are contained the feeding devices hereinbefore described for feeding the cartridges one by one from the magazine to the gun. To properly guide the cartridges in the cap M, it is provided with two guide-ribs, $m^2$ $m^3$, Fig. 34, the former in a position to guide the cartridge at the shell end, and the latter to guide the same at the projectile end. At the end opposite to that where the cap M is attached, which end is open, the frame F is provided with a spring-hook, $f'$, that holds the cartridges from falling out, and as the magazine may be readily replenished from that end, the spring-hook yielding and moving out of the way when the cartridges are inserted, the devices for locking the feeding mechanism above described out of action may be dispensed with. The cap M has a strap or retaining-plate, M', provided with spring-catch $m^4$ for securing the magazine to the side of the receiver R, that has a loop, R$^2$, for the reception of the plate M', so that the magazine will stand vertically above the gun, the cartridge being fed to cap M by gravity. It will be seen that by simply pressing the spring-hook $m^4$ out of engagement with the lower face of loop R$^2$ the magazine may be withdrawn.

To adapt the gun for use with paper cartridge-cases U, such as shown in Figs. 37 and 38, such cases being provided with metallic guide-strips $u$, to guide the cartridges properly, the gun is provided with a case-holder, M$^2$, Figs. 35 and 36, into which the paper cartridge-cases are inserted, and which holder has the cap M, containing the feeding devices, the holder being provided with a strap, M', having a spring-catch, $m^4$, for securing the holder and cartridge-case to the gun, as above set forth in reference to Figs. 31 to 36. These paper cartridge cases U are those usually employed for packing ammunition into packages of a given number of rounds, and for the purposes to which they are here intended are provided with a notch, $u'$, Fig. 37, with which engages a spring-catch, $m^5$, on the holder M$^2$, Fig. 35, to hold the case firmly within said holder when inserted with its open end down. To remove the case it will only be necessary to disengage the catch $m^5$ from the notch $u'$, when a fresh case may be inserted into the holder M$^2$. These cartridge-cases U are closed at one end and open at the other, and to prevent the cartridges from falling out a cord, $u^2$, terminating in a loop, $u^3$, is carried through the opening in the side of the case or through a hole formed for the purpose, so that the cord will form a loop within the case, that extends across the open end thereof, to hold the tier of cartridges securely in position, as shown in Figs. 37 and 39. To release the cartridges, it will only be necessary to pull upon the loop to withdraw the cord from the case U. In practice the case U is first inserted into the holder M$^2$. The cord is then removed, when the cartridges will move by gravity into the feed-cap M of the holder. The cases U or the frame F may contain any desired number of cartridges.

To adapt the gun for continuous rapid firing, we employ a magazine, V, Figs. 40, 41, and 42, that is curved or bent. It is provided with the guide-grooves $f$ described in reference to frame F, and is adapted to receive about thirty cartridges. When this magazine is used, the gun is secured to a rack or stand, and the magazine connected by its curved end with the holder M$^2$ or the frame F, attached to the gun, as described; or, if desired, said magazine V may be attached to the gun itself, when it will be provided with a cap, M, or to the feed-cap M, and then filled with cartridges. To facilitate the introduction of the cartridges into the magazine V, it has an opening, $v$, in its upper end, to which is hinged a gate, $v'$, that is held open by a spring, $v^2$. To fill the magazine, an ordinary paper case, V', full of cartridges, having its edges $v^3$ turned back, is introduced with its open end into the mouth of the magazine in such manner that the gate $v'$, when pressed down, will impinge upon all the cartridge-shells near their flanges, as shown in Fig. 43, and by withdrawing the paper case all the cartridges therein will be laid in a row into the upper end of the magazine with their flanges in the guide-groove $f$. In this use of the gun the services of two men are required, one for supplying the cartridges to the magazine and the other for the manipulation of the gun. Since the opening of the breech is effected by a simple forward movement of the trigger-guard lever, and the empty shell is extracted and ejected by the power of a spring acting on the breech-block B, which in turn actuates the extractor E, as above described, there is no great effort required on the part of the marksman in the performance of these operations, nor is he annoyed by the ejection of the shells, which are deflected laterally from the gun. The marksman can therefore fire any desired number of shots successively without moving the gun from the shoulder or the position into which it has been adjusted on the stand or for effective firing. The rapidity of fire is about ten shots in every five or six seconds; but when the gun is secured to a stand ten shots may be fired in two and five-tenths seconds; and if the magazine is served by an assistant thirty shots may be fired in fifteen seconds. When the repeating or feeding mechanism is used, and the aim is to be an accurate one for each shot fired, ten shots may be fired in twenty seconds, and when used as a single-loader twenty shots may be fired in a minute.

Having now described our invention, what we claim, and desire to secure by Letters Patent, is—

1. In a breech-loading gun, the combination, substantially as described, of a vertically-swinging breech-block, a spring connected therewith and exerting its tension to draw said block downwardly, an angular shell-extractor arranged to be actuated by the breech-block when oscillated on its pivot, and a pivoted trigger-guard constructed to support the breech-block against the stress of its spring, whereby on the forward movement of the trigger-guard the breech-block is released and drawn downward by the spring to uncover the breech and actuate the extractor to extract the shell.

2. In a breech-loading gun, the combination, substantially as described, of a vertically-swinging breech-block having a groove, $b^3$, in its upper face, the rear end of which diverges laterally, and a horn, $B^4$, projecting from the inner edge of the groove near its diverging end, a spring connected with the breech-block and exerting its power to draw the same downwardly, an angular shell-extractor arranged to be actuated by the breech-block when oscillated on its pivot, and a pivoted trigger-guard constructed to support the breech-block against the stress of its spring, whereby on the forward movement of said trigger-guard the breech-block is released and drawn down by the spring, the shell-extractor actuated, and the shell propelled along the groove and deflected laterally by the horn.

3. In a breech-loading gun, the combination, substantially as described, with a breech-block pivoted at its rear end, a spring exerting its power to draw down the forward end of the block, and an angular shell-extractor pivoted in front of the block, with one of its arms extended into the path thereof, of a hammer provided with a shoulder, $h$, and a trigger-guard provided with an extension, $G'$, both pivoted below said breech-block near its rear end, and supporting the same against the stress of its spring when the gun is fired, and simultaneously moving from under the breech-block when the trigger-guard is moved forward, for the purposes set forth.

4. In a breech-loading gun, the combination, substantially as described, with a breech-block pivoted at its rear end, a hammer provided with a shoulder, $h'$, and a trigger-guard provided with an extension, $G'$, both pivoted below the block at said rear end and supporting the same in its elevated position, of an auxiliary support for said breech-block, consisting of a lever pivoted in front of and connected with and operated by the trigger-guard, whereby said breech-block is supported from three points when the gun is fired, and released by the simultaneous movement of the supports from under the block on the forward movement of the trigger-guard, for the purposes specified.

5. In a breech-loading gun, the combination, substantially as described, with a breech-block pivoted at its rear end, and an angular shell-extractor pivoted in front of the block, with one of its arms in the path thereof, of a hammer provided with a shoulder, $h'$, and trigger-guard having an extension, $G'$, both pivoted below the breech-block at its rear end, and an auxiliary support for the latter consisting of a lever pivoted in front of and operated by the trigger-guard, whereby said block is supported from three points when the gun is fired, and released to actuate the extractor by the simultaneous movements of its supports from under it on the forward movement of the trigger-guard.

6. The combination of the breech-block B, pivoted at its rear end and provided with a guide-groove, $B^3$, in its upper face, the rear end of which diverges laterally, and a horn, $B^4$, projecting from the inner edge of the groove at its point of divergence, with the cartridge-extractor pivoted in front of the breech-block with its arm extending into the path thereof, whereby the extractor is operated on the downward movement of the breech-block and the empty cartridge-shell carried along the groove thereof and deflected laterally by the horn, for the purposes specified.

7. In a breech-loading gun, the combination, substantially as described, with a vertically-swinging breech-block having a guide-groove, $B^3$, in its upper face, a hammer provided with an arm or nose, $h^2$, and a pivoted trigger-guard, both constructed to support the breech-block in position to close the breech and release the same on the forward movement of the trigger-guard, of the angular lever L′, operating to support the breech-block when released, and through the medium of the nose $h^2$ of the hammer to raise the same, and bring its guide-groove on a line with the breech, for the purpose specified.

8. In a breech-loading gun, the combination, substantially as described, with the vertically-swinging breech-block having a guide-groove, $B^3$, in its upper face, and a horn, $B^4$, on one side thereof, of the spring B′, connected with the block and exerting its power to draw the same downwardly, the shell extractor E, pivoted in front of said breech-block, with its arm extended in the path thereof, the hammer H, provided with the noses $h$ $h^2$ and shoulder h′, the trigger-guard G, having extension G′, both pivoted below the breech-block at its rear end, and the lever L, pivoted in front of the hammer and trigger-guard and connected with the latter, said lever, the hammer, and trigger-guard supporting the breech-block in position to close the breech, and co-operating therewith to first release it to actuate the extractor, then elevate it to bring its guide-groove on a line with the breech and bring the hammer to full-cock, for the purpose specified.

9. In a breech-loading gun, the combination, substantially as described, with the vertically-swinging breech-block, the hammer H, having nose $h$, projecting from its upper front face, a notch, $h^4$, in its rear face, with which engages the sear, and a shoulder, h′, projecting laterally from said hammer into the path of the trigger-guard extension, and the trigger-guard G, having extension G′, said hammer and trigger-guard being arranged to support the breech-block to close the breech, of the sear S, whereby on the forward movement of the trigger-guard the breech-block is released and the hammer moved backward into position of full-cock, for the purpose specified.

10. In a breech-loading gun, the combination, substantially as described, with a vertically-swinging breech-block provided with a guide-groove in its upper face, and a cartridge-conveyer arranged with its head to vibrate along said groove, of a pivoted trigger-guard provided with an extension, G′, and a transmitting-lever operated by the said extension to vibrate the cartridge-conveyer when the breech-block is in proper position to carry a cartridge into the breech.

11. In a breech-loading gun, the combination, substantially as described, with a vertically-swinging breech-block provided with a guide-groove in its upper face, and a cartridge-conveyer arranged with its head to vibrate along said groove, of a pivoted trigger-guard provided with an extension, G′, and a transmitting-lever, L, connected with the said extension by a link, $l$, and operated by the movement of the trigger-guard to vibrate the cartridge-conveyer to convey a cartridge into the breech.

12. In a breech-loading gun, the combination, substantially as described, with a breech-block pivoted at its rear end, and provided with a guide-groove in its upper face, an angular shell-extractor pivoted in front of the block, with its arm extending in the path thereof, a cartridge-conveyer arranged with its head to vibrate along said groove, and a sear, S, of a trigger-guard provided with an extension, G′, a hammer provided with the shoulder h′ and notch $h^4$, respectively, with which the rear face of the extension and the sear engage, an angular gravity-lever, and a transmitting-lever pivoted in front of and operated, respectively, by the hammer and trigger-guard when the latter is moved forward, and whereby the breech-block is moved down to uncover the breech and actuate the extractor, then elevated with its groove on a line with the breech through the gravity-lever, the cartridge-conveyer vibrated through the transmitting-lever, and the sear brought into engagement with the hammer, for the purposes specified.

13. In a breech loading gun, the combination, substantially as described, with a breech-block pivoted at its rear end and having a guide-groove, $B^3$, in its upper face, a spring connected therewith and operating to draw said block down, an angular shell-extractor pivoted in front of the breech-block, with its arm in the path thereof, a cartridge-conveyer arranged with its head to vibrate along said groove, of the trigger-guard G, its extension G′, the hammer H, having shoulder h′ for engagement with said extension, both pivoted below at the rear end of the breech-block, the transmitting-lever L, pivoted in front of the hammer and trigger-guard and linked to the extension of the latter and assisting the same and the hammer to support the breech-block against the stress of its spring and to vibrate the cartridge-conveyer, said parts being operated through the trigger-guard, as and for the purposes set forth.

14. In a breech-loading gun, the combination, substantially as described, with the breech-block B, pivoted at its rear end, and provided in its upper face with a guide-groove, $B^3$, a cartridge conveyer arranged with its head to vibrate along said groove, and the notched lug $a$ on the conveyer-pivot, of the trigger-guard G, its extension G′, the lever L, linked to and assisting the trigger-guard to support the breech-block, the spring-pawl $l^3$, pivoted to the foot of lever L, and arranged to engage the notch of the lug to vibrate the cartridge-conveyer when the trigger-guard is manipulated, for the purposes specified.

15. In a breech-loading gun, the combination, substantially as described, with the breech-block B, pivoted at its rear end, and provided with a groove in its upper face, the cartridge-conveyer A, one end of which is arranged to vibrate along said groove, and the lugs $a\ a'$ on the pivot of said conveyer, of the trigger-guard G, its extension G', having an arm, $g^2$, arranged to engage the lug $a'$, the lever L, linked to and assisting the trigger-guard extension to support the breech-block in position to close the breech, the pawl $l^3$, pivoted to the foot of lever L, and the horn $c^3$, projecting from the lock-case to guide the spring-pawl into engagement with the lug $a$, said parts being operated from and through the movements of the trigger-guard, for the purposes set forth.

16. In a breech-loading gun, the combination, substantially as described, of a vertically-swinging breech-block having a guide groove in its upper face, a firing-pin arranged within the block, an angular cartridge-extractor pivoted in front of the block with one of its arms extended into the path thereof, and a cartridge-conveyer arranged to vibrate in the groove of the block, with a hammer and a trigger-guard pivoted below the breech-block at its rear end, said trigger-guard having an extension, G', a sear adapted to engage the hammer, and suitable mechanism operated from the hammer and trigger-guard, whereby on the rearward movement of the latter the breech-block is elevated with its groove on a line with the breech-chamber, the conveyer vibrated to carry a cartridge into the breech, and thereby return the extractor into its normal position, and the hammer brought into engagement with the sear, and the breech-block elevated to close the breech, for the purpose specified.

17. In a breech-loading gun, the combination, substantially as described, with a vertically-swinging breech-block, a firing-pin arranged therein, and a hammer having a shoulder, $h'$, and a notch, $h^4$, of a trigger-guard having an extension, G', a sear adapted to engage the notch $h^4$ of the hammer, and a lug or projection on the trigger-guard to disengage said sear from the hammer-notch, whereby on the rearward movement of the trigger-guard it is made to automatically discharge the gun, for the purpose set forth.

18. The combination, substantially as herein described, with the hammer H, having a full-cock notch, $h^4$, and the sear S, provided with the depending arm $s'$, of the trigger-guard G, the trigger T, pivoted thereto, and a locking device to lock the trigger in position to bring a projection thereof into engagement with the arm $s'$ of the sear when the trigger-guard is moved to the limit of its rearward motion, for the purposes specified.

19. The combination, with the lock mechanism of a gun, of a pivoted sear provided with a semi-cylindrical recess and a locking-pin provided with a cut-away portion having a flat surface opposite the said recess, whereby on rotating the pin the sear is locked against movement on its pivot by the engagement of the pin with the recess, as described, for the purposes specified.

20. In a breech-loading gun, the combination, substantially as described, with the receiver, a vertically-swinging breech-block, a cartridge-conveyer arranged to vibrate along the upper face of said block, a pivoted trigger-guard, and a transmitting-lever operated from said trigger-guard to vibrate the conveyer, of a magazine and cartridge-feeding devices connected to the receiver and controlled by the conveyer, for the purpose specified.

21. The combination, with the receiver R, of a separate closed casing, C C', detachably connected therewith, in which casing are arranged the breech and lock mechanism, substantially as described, for the purposes specified.

22. In a breech-loading gun, the combination, substantially as described, with the receiver, of a vertically-swinging breech-block, a trigger-guard pivoted below the breech-block near its rear end, and a cartridge-conveyer constructed to vibrate along the upper surface of the breech-block, and secured to a pivot arranged in front of the trigger guard, and mechanism operated from the trigger-guard to vibrate the cartridge-conveyer, for the purpose specified.

23. In a breech-loading gun, the combination, with the receiver, a vertically-swinging breech-block, a trigger-guard pivoted below the latter near its rear end, a cartridge-conveyer constructed to vibrate along the upper face of said block, and secured to a pivot arranged in front of the trigger-guard, and mechanism operated from the trigger-guard to vibrate the conveyer, of cartridge-feeding devices consisting of the lever N, actuated by the trigger-guard, the lever O, and gate $N^2$, actuated by the lever O, said parts being arranged on one side at the upper edge of the receiver, and operating substantially as described, for the purpose specified.

24. In a breech-loading gun, the combination, with the receiver, a vertically-swinging breech-block having a diverging groove, $B^3$, in its upper face, and a horn, $B^4$, projecting from the inner edge of said groove in its diverging end, and a cartridge-conveyer arranged to vibrate in said groove, of cartridge-feeding devices operated by the conveyer, consisting of the lever N, the lever O, and gate $N^2$, operated from said lever N, said parts being arranged on one side at the upper edge of the receiver, and operating substantially as described, for the purpose specified.

25. The combination in a breech-loading gun, with the receiver, a vertically-swinging breech-block and a cartridge-conveyer arranged to vibrate along the upper face of the block, of a cartridge-magazine attached to one side of the receiver and containing cartridge-feeding and retaining devices consisting of the lever N, operated from the conveyer, the lever O, and gate $N^2$, operated from lever N, said parts constructed and arranged for operation substantially as described, for the purpose specified.

26. In a breech-loading gun, the combination, with the receiver, the vertically-swinging breech-block A, and a cartridge-conveyer arranged to vibrate along the upper face of the breech-block, of a cartridge-magazine, the casing M from which the magazine is supported, said casing being attached to one side of the receiver, and provided in its upper end with the opening $m$ and spring-gate $m'$ for closing said opening, and cartridge feeding and retaining devices arranged in said casing M and operated from the conveyer, whereby the magazine may be replenished through the opening $m$ of casing M, said parts being arranged for co-operation substantially as and for the purpose specified.

27. In a breech-loading gun, the combination, with the receiver R and the breech-block B, provided with a groove in its upper face, of a cartridge-magazine secured to one side of the receiver to feed the cartridges into the groove of the block by gravity, cartridge-feeding devices arranged in the head of the magazine, actuated by the lock mechanism to allow one cartridge at a time to pass into said groove, and consisting of the lever N, and the lever O, and latch $N^2$, operated from the lever N, said parts being arranged for co-operation substantially as and for the purpose specified.

28. In a breech-loading gun, the combination, with the receiver R and the breech-block B, provided with a groove, $B^3$, in its upper face, and a cartridge-magazine open at both ends, secured to one side of the receiver to feed the cartridges into the groove of the block by gravity, of a cartridge-case open at one end and provided with cartridge-retaining devices consisting of the cord $n^2$, secured at one end to the case and passing around the cartridges at the open end, thence through one of the walls of said case, whereby on the withdrawal of the cord the cartridges, when the case is inserted into the magazine, are free to move by gravity out of the feed end thereof, substantially as and for the purpose specified.

In testimony whereof we affix our signatures in presence of two witnesses.

CARL SALVATOR.
GEORG RITT. v. DORMUS.

Witnesses as to Carl Salvator:
COATE SCAPINELLI,
FRANZ R. VON THERBERLEIN.

Witnesses as to Georg Ritt. v. Dormus:
JAMES RILEY WEAVER,
CLARENCE M. HYDE.